(12) United States Patent
Maier et al.

(10) Patent No.: US 9,669,715 B2
(45) Date of Patent: Jun. 6, 2017

(54) CURRENT COLLECTOR SYSTEM, CRANE SYSTEM AND METHOD FOR DELIVERING A CURRENT COLLECTOR TROLLEY TO A BUSBAR

(75) Inventors: Bernd Maier, Schliengen (DE); Frank Kreiter, Malsburg-Marzell (DE); Joerg Saettele, Efringen-Kirchen (DE); David Brander, Loerrach (DE)

(73) Assignee: Conductix-Wampfler GmbH, Weil am Rhein (DE)

( * ) Notice: Subject to any disclaimer, the term of this patent is extended or adjusted under 35 U.S.C. 154(b) by 372 days.

(21) Appl. No.: 14/005,862

(22) PCT Filed: Mar. 15, 2012

(86) PCT No.: PCT/EP2012/054589
§ 371 (c)(1),
(2), (4) Date: Dec. 2, 2013

(87) PCT Pub. No.: WO2012/130630
PCT Pub. Date: Oct. 4, 2012

(65) Prior Publication Data
US 2014/0305760 A1    Oct. 16, 2014

(30) Foreign Application Priority Data
Mar. 31, 2011    (DE) .................. 10 2011 001 712

(51) Int. Cl.
*B60L 5/00* (2006.01)
*B60L 5/08* (2006.01)
(Continued)

(52) U.S. Cl.
CPC ..... *B60L 5/08* (2013.01); *B60L 5/38* (2013.01); *B60M 1/307* (2013.01); *B66C 13/12* (2013.01); *B66C 19/007* (2013.01)

(58) Field of Classification Search
CPC .... B60L 5/00; B60L 5/08; B60L 5/085; B60L 5/38; B60M 1/30; B60M 1/307; B66C 13/12; B66C 19/007
See application file for complete search history.

(56) References Cited

U.S. PATENT DOCUMENTS 3,786,204 A * 1/1974 Laurent .................... B60L 5/08
                                               191/45 R
3,786,762 A * 1/1974 Corkum .................... B60L 5/38
                                               104/130.07
(Continued)

FOREIGN PATENT DOCUMENTS

AT           505 757        4/2009
CN        101993005 A       3/2011
(Continued)

OTHER PUBLICATIONS

English Translation of the Written Opinion (WO) published Sep. 30, 2013 for International Patent Application No. PCT/EP2012/054589 filed Mar. 15, 2012.
(Continued)

*Primary Examiner* — Jason C Smith
(74) *Attorney, Agent, or Firm* — Paul D. Bianco; Gary S. Winer; Fleit Gibbons Gutman Bongini & Bianco PL (57) ABSTRACT

A current collector system for a vehicle movable along a busbar arrangement, with at least one current collector trolley and current collector contacts arranged thereon that can be connected to a busbar of the busbar arrangement and with a vertical delivery unit for moving the current collector trolley in a vertical delivery direction, or with a horizontal delivery unit with at least one delivery element movable in a horizontal delivery direction for moving the current collector trolley in the horizontal delivery direction, as well as a corresponding crane system. The current collector trolley can be moved by a belt drive with an elastic and/or flexible (Continued)

belt in the vertical delivery direction, or in that the delivery element can be moved via a belt drive with an elastic and/or flexible belt in the horizontal direction, and with a crane system equipped with the above.

25 Claims, 6 Drawing Sheets

(51) Int. Cl.
    *B60L 5/38*     (2006.01)
    *B60M 1/30*     (2006.01)
    *B66C 13/12*     (2006.01)
    *B66C 19/00*     (2006.01)

(56) References Cited

U.S. PATENT DOCUMENTS

| | | | | |
|---|---|---|---|---|
| 4,723,641 A * | 2/1988 | Baker | ........................ | B60L 5/08 191/49 |
| 5,924,837 A | 7/1999 | Passmann | | |
| 6,152,273 A * | 11/2000 | Kilkenny | .................. | B60L 5/08 191/58 |
| 6,286,646 B1 * | 9/2001 | Van Zijverden | .......... | B60L 5/36 191/45 R |
| 6,416,022 B1 | 7/2002 | Crespi | | |
| 8,727,085 B2 * | 5/2014 | Hiebenthal | ............... | B60L 5/08 191/45 R |
| 9,014,898 B2 * | 4/2015 | Saito | ........................ | B60L 5/045 191/33 R |
| 2009/0136331 A1 | 5/2009 | Muser | | |
| 2011/0220447 A1 * | 9/2011 | Schroder | .................. | B60L 5/38 191/50 |
| 2014/0305760 A1 * | 10/2014 | Maier | ........................ | B60L 5/08 191/59.1 |

FOREIGN PATENT DOCUMENTS

| | | |
|---|---|---|
| DE | 9110687 | 10/1991 |
| DE | 196 13 700 A1 | 3/1996 |
| DE | 20012574 U1 | 10/2000 |
| FR | 2699747 | 6/1994 |
| JP | 4 256609 | 9/1992 |
| JP | 19924256609 | 9/1992 |
| JP | 2009242101 | 10/2009 |
| JP | 2010143650 | 7/2010 |
| WO | 2010054852 | 5/2010 |

OTHER PUBLICATIONS

English Translation of International Preliminary Report on Patentability (IPRP) published Oct. 2, 2013 for International Patent Application No. PCT/EP2012/054589 filed Mar. 15, 2012.
Internattonal Search Report (ISR) published Oct. 4, 2012 for PCT/EP2012/054589 filed Mar. 15, 2012.
Written Opinion for PCT/EP2012/054589 filed Mar. 15, 2012.
Opposition filed on Mar. 3, 2015, Paul Vahle Gmbh & Co. KG, with related papers.
Chinese Examination Report with translation for Chinese Patent Application No. 201280016795.4, Feb. 5, 2016.
Chinese Examination Report for Chinese Patent Application No. 201280016795.4, Oct. 24, 2016, 14 pages.
Energy management chain, 4 pages, from German Wikipedia, retrieved Oct. 2, 2016, publication date believed to be no later than Aug. 13, 2007.
Wilhelm Matek, Dieter Muhs & Herbert Wittel: Chapter 16: Belt Drive in Machine Elements, Standardization calculation design, pp. 690-691, Friedr. Vieweg & Sohn Braunschweig/Wiesbaden (11th Edition, 1987), 8 pages.
Letter re Opposition to the European Patent EP2616379 dated Oct. 16, 2016, 6 pages.
Manfred Lorenz et al.: Chapter 4: Energy chain systems for crane systems in new technology on Hoist, pp. 15-22, expert verlag Renningen (vol. 607, 2002), 44 pages.
Horst Czichos, Chapter 4.5.2: Gear transmission in the basics of engineering sciences, pp. k45-k48, Springer-Verlag Berlin (30th edition, 1996), 7 pages.
Letter re Opposition to the European Patent EP2616379 dated Aug. 30, 2016, 10 pages.

* cited by examiner

CURRENT COLLECTOR SYSTEM, CRANE SYSTEM AND METHOD FOR DELIVERING A CURRENT COLLECTOR TROLLEY TO A BUSBAR

FIELD OF THE INVENTION

The invention relates to a current collector system, a system, in particular a crane system and a method for delivering a current collector to a busbar.

BACKGROUND OF THE INVENTION

A current collector system for a vehicle, in particular for a container stacking crane, is known from WO 2010/054852 A2. The known current collector system is fixed to the support leg of the crane and is movable along a trackway on which at least one busbar is arranged. A collector trolley of the current collector system can create an electrical contact with the busbar via a current collector, the collector car being movable for this purpose to an introduction device for the trackway via a telescoping arm movable in the horizontal delivery direction. The collector trolley is supported so as to be freely movable in the vertical delivery direction on a guide of the telescoping arm. Thereby contacts of the current collector can be moved vertically by means of the introduction device up to the busbar in order to create an electrical contact with the busbar.

The freely movable supporting of the collector trolley has the disadvantage that an elaborate introduction device requiring considerable space must be provided for guiding the current collector and the current collector contacts to the busbar.

This will be described for the sake of example with reference to a schematic top view of a container handling center 101 shown in FIG. 1. Such container handling centers 101 are found in ports, principally for transferring containers from ships to freight trucks. Containers are stacked there in a variety of elongated container stacks 102. Travel lanes 103 for freight trucks, which are loaded and unloaded via container stacking cranes, not shown, are located between the container stacks 102. The container stacking cranes move in a travel direction F along the container stacks 102 and extend transversely to the travel direction over a plurality of container stacks 102. The container stacking cranes can also be moved from one block 104 of container stacks 102 to another block 105 of container stacks 106.

Trackways 107, 108 running in the travel direction F with busbars 109, 110 arranged thereon for supplying the container stacking cranes with electrical energy are located alongside the blocks 104, 105, as described in WO 2010/054852 A2, among other places. If a container stacking crane is to shift from block 104 to block 105, its current collector leaves the busbar 109 and drives to the next block 105 with a drive motor powered by fuel or a battery. At block 105, the current collector is then threaded by an introduction device into the busbar 110, from which the container stacking crane is supplied with electrical energy.

Figure 1:
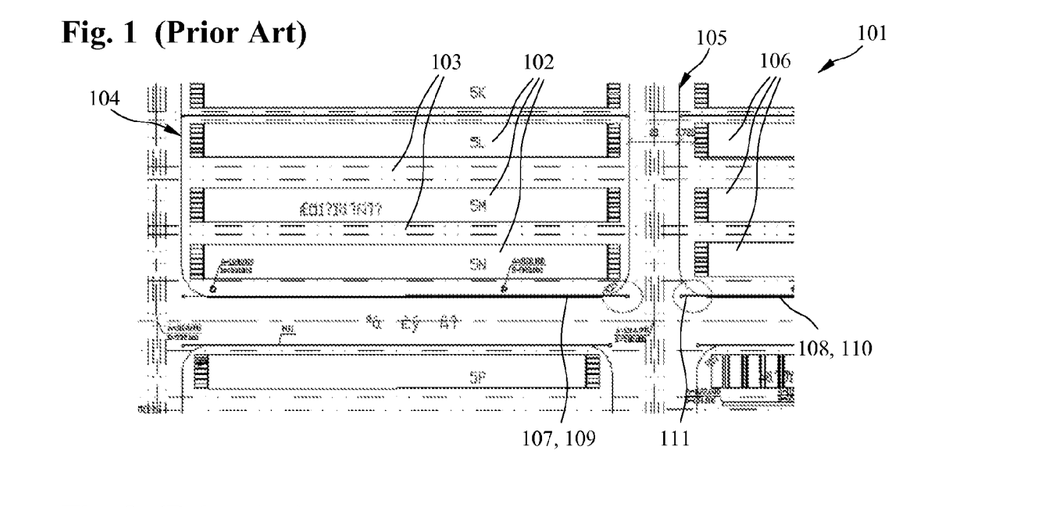
FIG. 1 shows a plan view onto a known container handling center.
Figure 2:
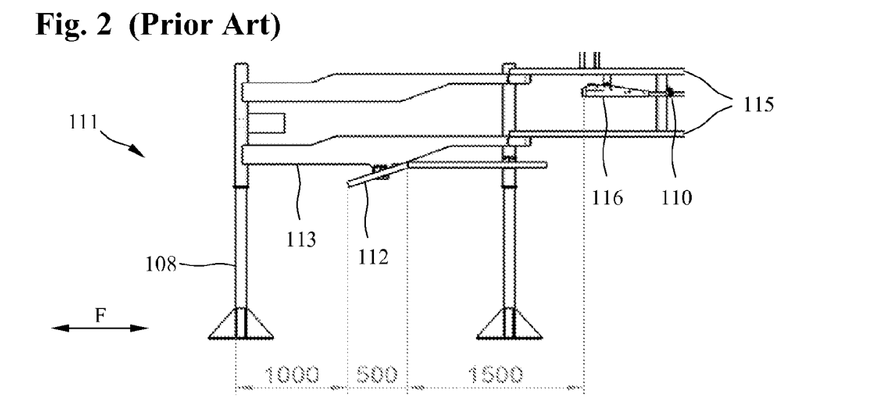
FIG. 2 shows a side view of an entry zone of the known container handling center from FIG. 1.

An entry zone 111, indicated by a circle in FIG. 1, of the trackway 108 is shown in a top view in FIG. 2. The trackway 108 has a conventional introduction device 112 for the container stacking crane, as is known from WO 2010/054852 A2. First the collector trolley is driven horizontally toward a stop plate 113 and strikes against it. Then the container stacking crane moves in the travel direction F to the busbar 110, the collector trolley, supported to move freely vertically, being brought by means of a first roller arrangement through the upwardly inclined introduction rail 114 to the proper height relative to the busbar 110. Then a second roller arrangement threads the trolley into support rails 115 of the trackway 108, and the current collector is contacted via a current collector introduction device 116 with the busbar 110 so that the container stacking crane is again supplied with electrical energy.

As is easily recognized from FIG. 2, the entry zone 111 requires a relatively large amount of space. Thus the busbar 110 only starts approximately 3.50 m away from the left-hand beginning of the trackway 108 in FIG. 2. Because an introduction device 116 and thus a relatively large entry zone are required at both ends of the trackway 108, considerable stacking space for containers is lost. The container stacking crane must after all be supplied with electrical energy from the busbar in order to lift and move the containers. In principle the entry zone could be made shorter, but that reduces the positioning accuracy of the current collector relative to the busbar in the entry zone, which can frequently lead to expensive and time-consuming damage to the current collector and the busbar.

Another disadvantage is that the container stacking crane must move much more slowly during the entry into the trackway 108 in order to be able to introduce the current collector into the support rails 115 via the introduction device 112 and 116.

Since the entry zone 111 projects far into the driving area designed for trucks, the entry zone 111 must be specially protected against collisions with the trucks.

SUMMARY OF THE INVENTION

The problem of the invention is therefore to overcome the above-mentioned disadvantages and to provide a current collector system and a crane system that allow a simple, low-wear and nevertheless fast and precise positioning and creation of an electrical connection between a current collector and a busbar of the current collector system, and that require little space.

The problem is solved by a current collector system with the characteristics of Claim 1 or Claim 8, and by a system, in particular a crane system, with the characteristics of Claim 19. Advantageous refinements and preferred configurations of the invention are specified in the subordinate claims.

A current collector system of the type mentioned above is characterized according to the invention in that the current collector trolley can be moved in the vertical delivery direction by means of a belt drive with an elastic and/or flexible belt.

In an advantageous embodiment of the current collector system, the belt drive can comprise two idle rollers arranged at opposite ends, in the vertical delivery direction, of the vertical delivery unit, wherein the current collector trolley can be fastened to a pulling strand of the belt.

In an advantageous further development, an energy chain, one end of which chain is fastened to the current collector trolley or a mounting plate for the current collector trolley and the other end of which is fastened to a frame part of the vertical delivery unit, can be provided on the vertical delivery unit to guide supply lines from the vehicle to the current collector trolley and/or to the vertical delivery unit. This reduces the risk of damage to the supply lines.

In addition, a lifting motor that can provide a holding force able to hold the current collector trolley in a desired vertical position can advantageously be provided to drive the belt in a favorable embodiment.

The lifting motor can preferably be provided with a position sensor for determining the position of the current collector trolley in the vertical delivery direction.

In a preferred embodiment, the belt can be an open-ended belt whose ends are held together by means of a clamping device, the clamping device advantageously clamping the ends of the belt together in such a manner that at least one end of the belt can be detached from the clamping device if a predetermined force is exceeded. Thereby destruction of or damage to the current collector system or the crane system can be provided in case of a malfunction that exceeds the ordinary operational lateral deviations of the vehicle from the busbar arrangement. Thereby the end of the belt can come loose and the belt is thus pulled off the vertical delivery unit. In that way the current collector trolley fastened via the clamping device to the belt can advantageously be separated from the vertical delivery unit, so that, in particular, damage to the sensitive current collector contacts and the busbar arrangement can be avoided.

Another current collector system of the type mentioned above is characterized according to the invention in that the delivery element can be moved in the horizontal delivery direction via a belt drive with an elastic and/or flexible belt.

In an advantageous further development of the current collector system, the delivery element in the horizontal delivery direction can be movably supported in an extension that is supported movably in the horizontal delivery direction in a mounting frame. In addition, an extension motor for moving the extension in the horizontal delivery direction can advantageously be arranged on the mounting frame. In an operationally favorable configuration, a drive pinion of the extension motor can mesh with a rack running in the horizontal delivery direction on the extension, whereby reliable driving is provided. The extension motor can advantageously be provided with a position sensor for determining the position of the current collector trolley in the horizontal delivery direction.

In a preferred configuration, the belt drive can comprise two idle rollers arranged at opposite ends, in the horizontal delivery direction, of the extension, about which rollers the belt circulates, wherein a fastening strand of the circulating belt is fixed to the mounting frame and a pulling strand is fixed to the delivery element.

In another advantageous further development, an energy chain, one end of which is fastened to the mounting frame and the other end of which is fastened to the delivery element, can be provided on the horizontal delivery unit to guide supply lines from the vehicle to the current collector trolley. This reduces the risk of damage to the supply lines.

The belt or belts can preferably be implemented as toothed belts. A rubber material or a rubberized cloth or fabric belt can be furnished as the material. In addition, a tensioning device for adjusting the initial tension of each belt can advantageously be provided for one or both belts.

The current collector system can advantageously be formed from a combination of the above-mentioned current collector systems with horizontal delivery by the horizontal delivery unit and vertical delivery by the vertical delivery unit. In such a combination, the vertical delivery unit can be arranged on a front end of the delivery element. In addition, the other end of the energy chain for the vertical delivery unit can advantageously be fastened to the front end of the delivery element rather than to a frame part of the vertical delivery unit.

A system, in particular a crane system, of the type mentioned above is characterized according to the invention in that the current collector system is constructed as explained above.

A method according to the invention for delivering a current collector trolley with current collector contacts for a current collector system, in particular according to the invention, arranged on a movable vehicle, in particular a crane, to a busbar of a busbar arrangement, in particular in a system according to the invention, is characterized in that the current collector trolley is delivered to the busbar in both the horizontal delivery direction and in the vertical delivery direction by means of a positioning unit.

In the method according to the invention, the current collector trolley can advantageously be moved simultaneously in two spatial directions, in particular in the horizontal delivery direction and the vertical delivery direction. Immediately before the introduction of the current collector contacts into the busbar, the current collector trolley can advantageously be delivered only in the vertical delivery direction after termination of the delivery in the horizontal delivery direction. The current collector trolley can also be first delivered in the horizontal delivery direction and then in the vertical delivery direction.

To enable as gentle and wear-free a movement of the current collector trolley as possible, the current collector trolley can first be moved slowly and then quickly in the horizontal delivery direction and/or the vertical delivery direction, and can be braked before the end of the delivery movement. For precisely targeted contacting of the current collector contacts with the busbar, the position of the current collector trolley in the horizontal and/or vertical delivery direction can additionally be determined via a position sensor on an extension motor for the horizontal delivery of the current collector trolley or a position sensor on a lifting motor for the vertical delivery of the current collector trolley (10).

BRIEF DESCRIPTION OF THE DRAWINGS

Additional details and advantages of the invention emerge from the following description of a preferred embodiment with reference to the accompanying drawings. Therein.

DETAILED DESCRIPTION OF THE INVENTION

Figure 4:
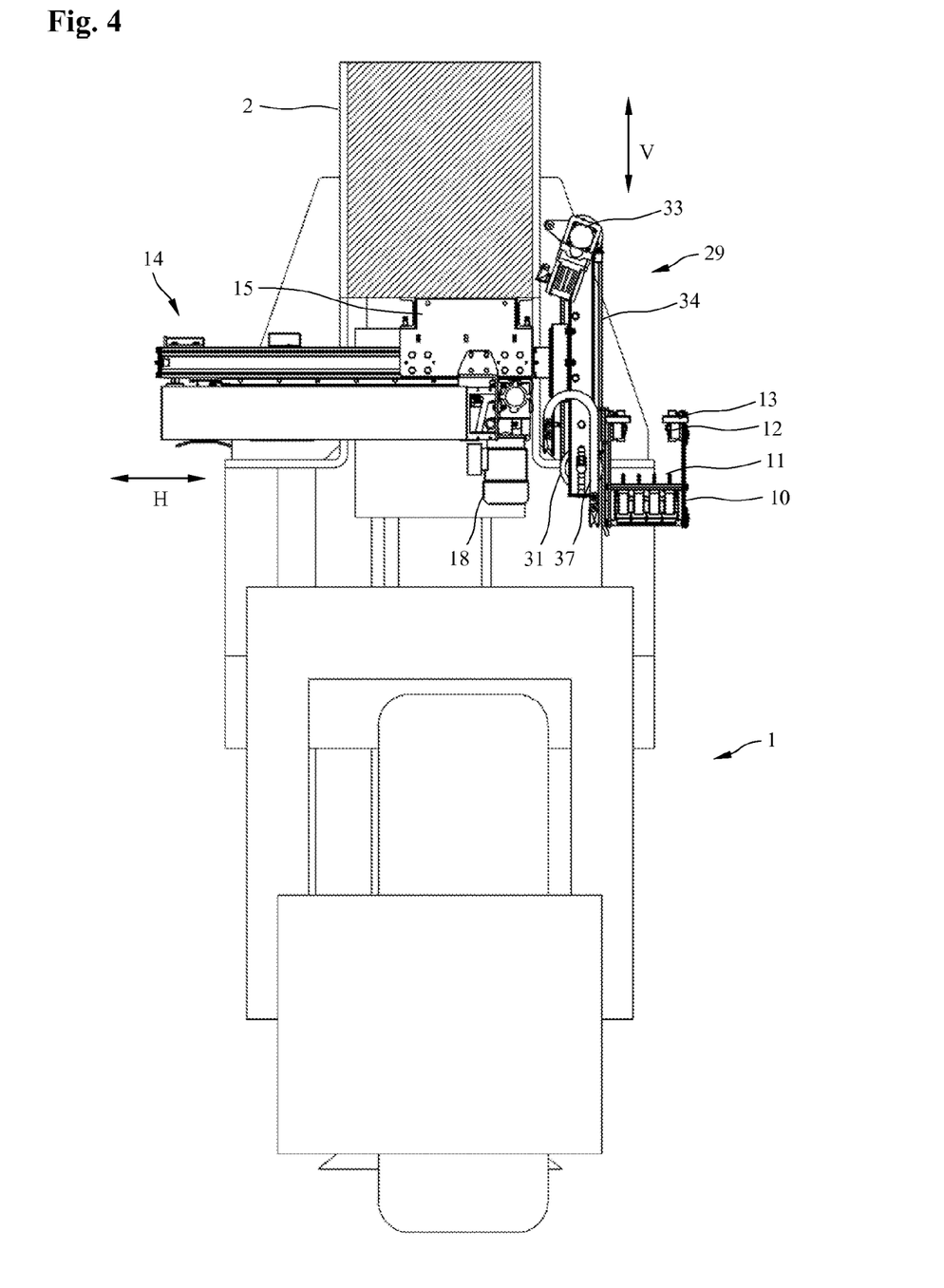
FIG. 4 shows a front-end plan view onto a part of the base of the crane system with a current collector system according to the invention arranged thereon.

FIG. 4 shows a movable base 1 of a vehicle constructed as a crane 2, only suggested graphically, from a crane system according to the invention that can be driven via rubber tires 3, only suggested graphically in FIG. 1, in a conventional container handling center 101.

Figure 3:
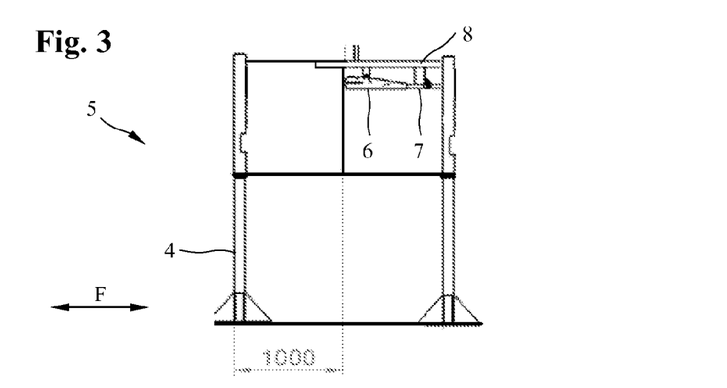
FIG. 3 shows an entry zone of a crane system according to the invention.

The crane 2 is supplied with electrical energy for handling containers from a busbar arrangement 4 according to the invention shown in FIG. 3. The busbar arrangement 4 is implemented as a conventional contact conductor system. An entry zone 5 of the busbar arrangement 4, unlike the entry zone 111 of the known trackway 108, does not have an entry funnel 112 with a stop plate 113 and an introduction rail 114. Instead there is only an entry assistance means 6 of a busbar 7 and only one support rail 8. A stop plate, not shown, can be provided in the area of the entry assistance means 6.

In contrast to the known trackway 108 from FIG. 2, the distance between the left end of the busbar arrangement 4 shown in FIG. 3 and the entry assistance means 6 is only 1 m here and not 3 m as in known designs. The entry zone 5 of the crane system according to the invention is therefore markedly shorter than that of the known ones.

Figure 5:
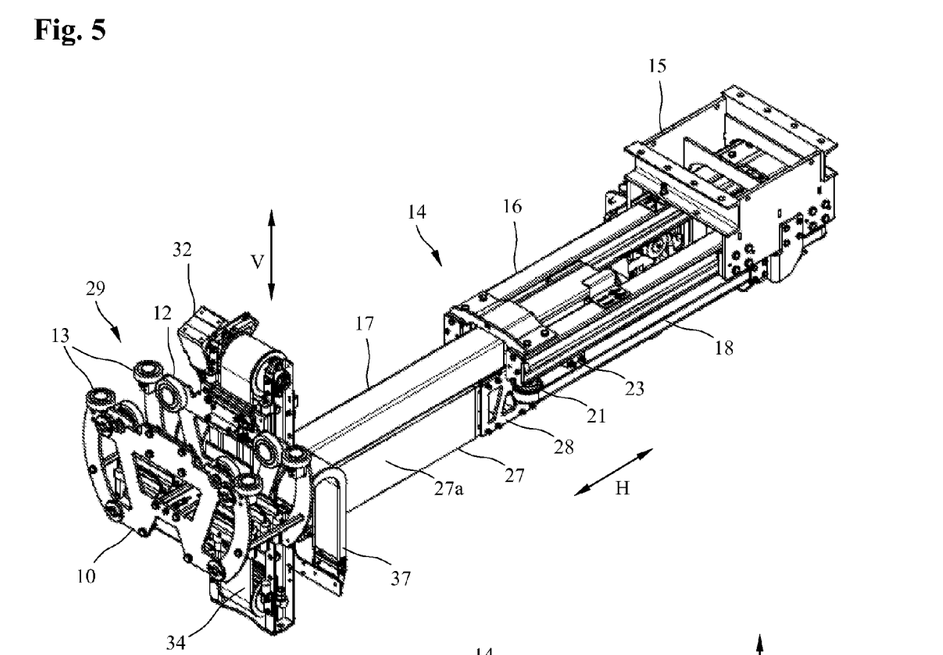
FIG. 5 shows a three-dimensional view of the current collector system from FIG. 4 in the extended position.
Figure 6:
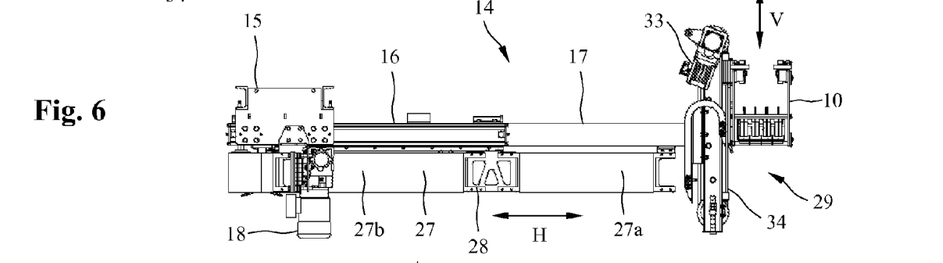
FIG. 6 shows a side view of the current collector system from FIG. 4 in the extended position.

This is made possible by a current collector system 9 shown in FIG. 4 at the crane base 1, and in a three-dimensional view in FIG. 5 from the right side in FIG. 4. The current collector system 9 is arranged at the upper part of the crane base 5, roughly at the same height as the busbar 7. For connection with the busbar 7, the current collector system 9 comprises a current collector trolley 10 with several current collector contacts 11. The current collector trolley 10 is guided by means of support rollers 12 and guide rollers 13 in the support rail 8.

In order to be able to connect the current collector trolley 9 to the busbar 6, the crane base 1 of the crane 2 moves into the entry zone 5 of the busbar arrangement 4 in the vicinity of the entry assistance means 6. To avoid collisions with containers or other components during the travel of the crane 2, the current collector trolley 10 is driven in the retracted position shown in FIG. 4. Then the current collector trolley 10 is moved with the assistance of a positioning unit toward the entry assistance means 6 in both the horizontal delivery direction H transverse to the travel direction of the crane base 1 and in the vertical delivery direction V. Thereby the current collector trolley 10 can be simultaneously moved in two spatial directions so that the current collector trolley 10 can be delivered quickly and directly to the busbar 7. Only immediately before insertion of the current collector contacts 11 into the busbar, e.g., a contact conductor, after conclusion of the horizontal delivery, is there a vertical delivery. Alternatively there can first be a purely horizontal delivery and then a purely vertical delivery.

The current collector trolley 10 is delivered in the horizontal delivery direction H via a horizontal delivery unit 14 shown in FIGS. 4-12. The horizontal delivery unit 14 comprises a mounting frame 15 that is fixed to the crane base 1.

An extension 16 running in the horizontal delivery direction H transverse to the travel direction F of the crane base 1 is movably arranged in the mounting frame 15. The extension 16 can be moved between the extended position shown in FIG. 6 and the completely retracted position shown in FIG. 7. A first delivery element implemented as a slide 17 is arranged in the extension 16 movably relative to the extension 16, again in the horizontal delivery direction H, wherein the slide 17 can be completely retracted into the extension 16. The current collector trolley 10 is arranged at the front end of the slide 17, i.e., at the left end in FIG. 5 and at the right end in FIGS. 4, 6, 7 and 9-12.

Figure 7:
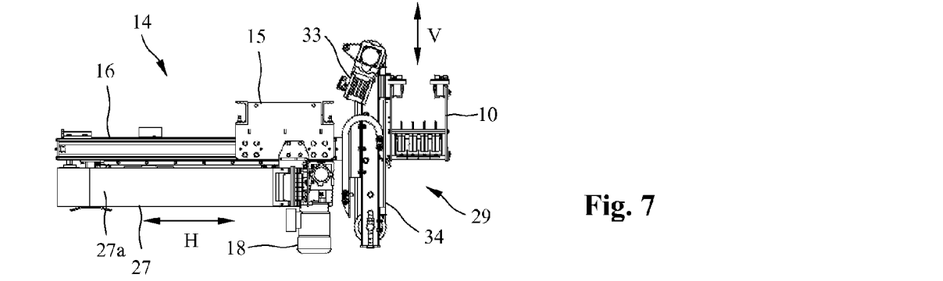
FIG. 7 shows a side view of the current collector system from FIG. 6 in the retracted position.
Figure 8:
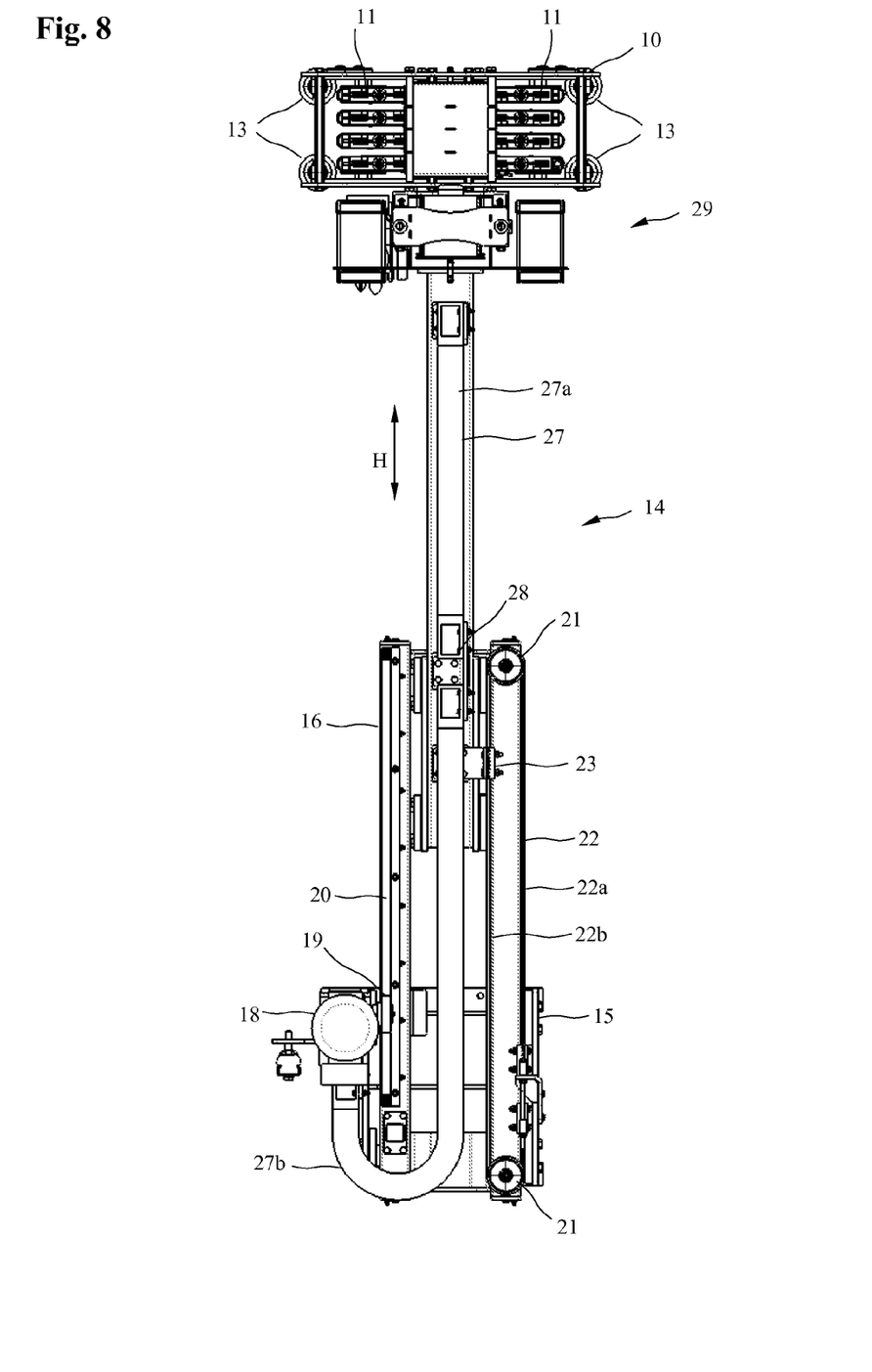
FIG. 8 shows a plan view of the current collector system from FIG. 5 in the extended position.
Figures 9, 12:
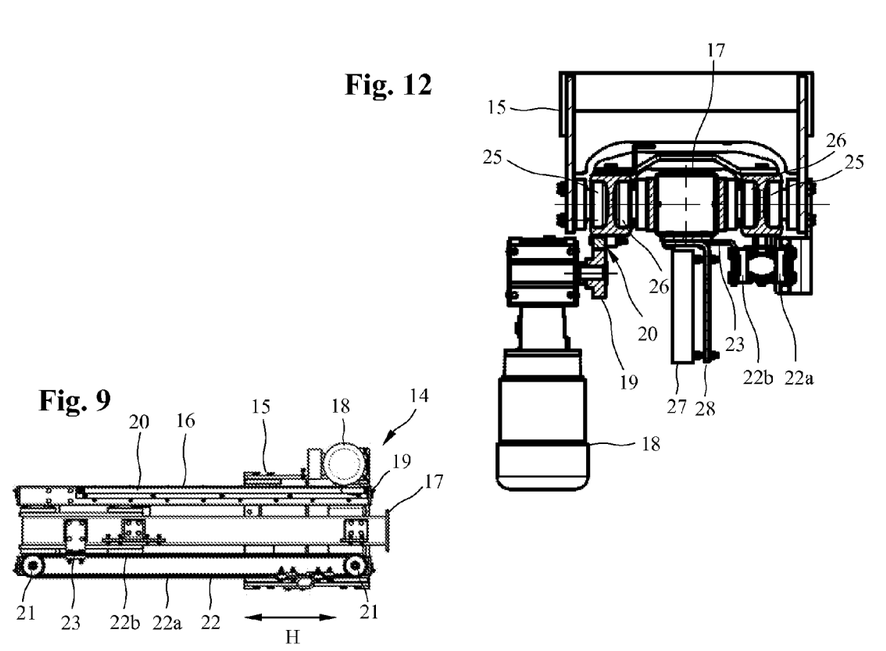
FIG. 9 shows a plan view of a horizontal delivery unit from the current collector system of FIG. 5 in the completely retracted position.
FIG. 12 shows a cross section through the delivery unit from FIG. 10 along the line A-A.

Since both the extension 16 and the slide 17 are arranged movably in the horizontal delivery direction H, the current collector trolley 10 can be displaced between the completely retracted position shown in FIGS. 4, 7 and 9 into the completely extended position shown in FIGS. 5, 6, 8 and 12.

The displacement of the extension 16 and the slide 17 is accomplished as described below. As is shown especially recognizably in FIG. 8, an extension motor 18 implemented as an electric motor is mounted on the mounting frame 15 in order to move the extension 16. Via a drive pinion 19 (FIG. 11), the extension motor 18 drives a rack 20 mounted on the extension 16 that extends over almost the entire length of the extension 16. Thereby the extension 16 can be displaced between the positions shown in FIG. 9 and FIG. 12.

In order to be able to extend and retract the slide 17 without having to provide a separate electric motor, idle rollers 21, rotatable about axes running perpendicular to the travel direction F of the crane base 1 and perpendicular to the horizontal delivery direction H, are mounted at the front and rear ends of the extension 16. A belt 22 made of elastic and/or flexible material is placed around the idle rollers 21 and is fixed by a fastening strand 22a to the mounting frame 15, as is recognizable in FIG. 8. The slide 17 is fixed by means of an angle plate 23 to a pulling strand 22b of the belt 22.

Figure 10:
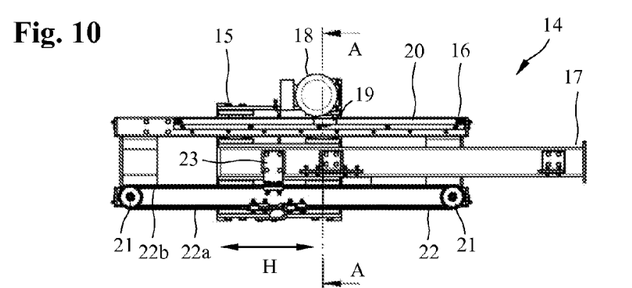
FIG. 10 shows a plan view of the delivery unit from FIG. 9 in a partially extended position.
Figure 11:
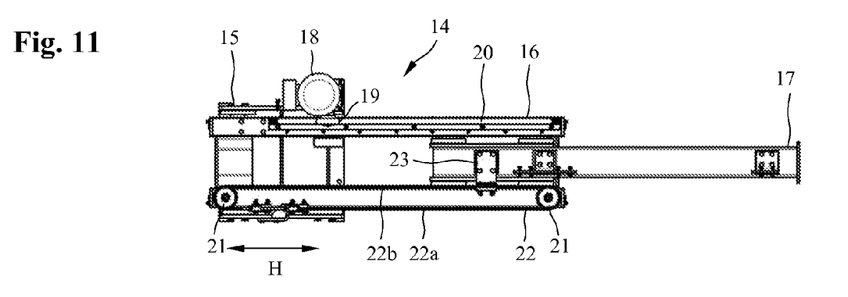
FIG. 11 shows a plan view of the delivery unit from FIG. 9 in the completely extended position.

If, as shown in FIGS. 9-11, the extension 16 is advanced in the horizontal delivery direction H by the extension motor 18 from the position shown in FIG. 9, i.e., moves toward the right in FIG. 9, then the belt 22 is moved in the direction shown in FIG. 10, i.e., runs counterclockwise around the idle rollers 21. Since the slide 17 is fixedly connected to the belt 22, the belt 22 entrains the slide 17, so that the slide 17 is moved in the same horizontal delivery direction H as is the extension 16. Thus the extension 16 and the slide 17 can be uniformly moved by simple means between the positions shown in FIGS. 9 and 11.

Since the belt 22 advantageously consists of an elastic material, a connection that is elastic within certain limits and has a shock absorbing effect is created between the current collector trolley 10 on the one hand and the mounting frame 15 on the other. The belt 22 can be implemented as a V-belt or a toothed belt for example, the idle rollers then being appropriately adapted to the belt shape.

In a preferred embodiment, the extension motor 18 can be switched to no-load operation after the entry of the current collector trolley 10 into the support rail 8 and the electrical contacting between the current collector contacts 11 and the busbar 7. Thereby the belt 22, inhibited by the initial tension of the belt 22 and possibly the inertia of the rotor of extension motor 18, can revolve around the idle rollers 21. The initial tension of the belt 22 is adjusted in such a manner that the current collector trolley 10 can be held in its horizontal position in normal operation without external interfering forces. If external interfering forces in the horizontal delivery direction occur during movement of the crane 2, for example because the busbar arrangement 4 does not run in exactly a straight line, then these changes will be compensated in the horizontal delivery direction H by a movement of the belt 22, and therefore the idling extension motor 18.

Alternatively or additionally, the extension motor 18 can also be driven in such a manner that it exerts a predetermined holding force on the belt 22, so that the belt 22 can be moved only if the predetermined forces are exceeded.

If a stop plate, not shown in the figures, is used in the area of the entry assistance means 6 for positioning the current collector trolley 10 in the horizontal delivery direction H, then the impacts appearing when approaching the stop plate can be resiliently absorbed by the elastic belt 22, whereby the wear of all involved parts can be reduced.

Figures 13, 14:
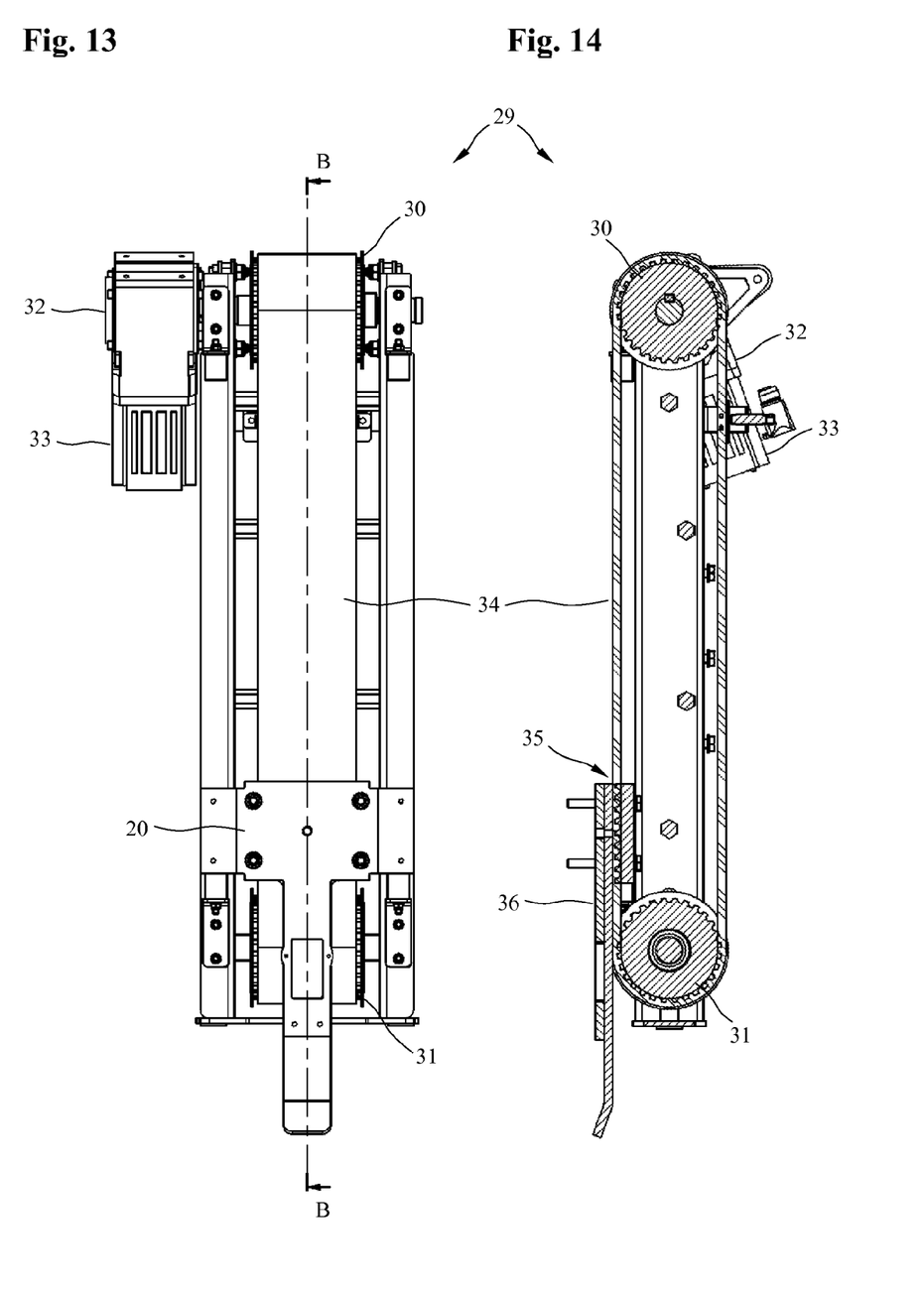
FIG. 13 shows a side view from the lower left in FIG. 5 of a vertical delivery unit from the current collector system of FIG. 5.
FIG. 14 shows a cross section through the delivery unit of FIG. 13 along the line B-B.

The structure of the horizontal delivery unit 14 will be clarified once again based on the cross section in FIG. 13 through the horizontal delivery unit 14 along the line A-A in FIG. 10. The driving of the extension 16 via the extension motor 18, the drive pinion 19 and the rack 20 mounted on the extension is easily recognized. The extension 16 comprises two double T-shaped rails 24 running parallel to one another that are movably supported on extension rollers 25 seated in the mounting frame 15. Slide rollers 26 seated rotatably on the slide 17 likewise engage in the other side of the double T-shaped rails 24, so that the slide 17 is movably supported on the extension 16. The belt 22 is fixed to a hollow crossbeam, with a rectangular cross section, of the slide 17.

In order to supply the electrical energy tapped on the busbar arrangement 4 by means of the current collector contacts 11 to the loads of the train, a horizontally flexible conventional energy chain 27 containing the electrical supply lines in the area of the horizontal delivery unit 14 is fixed to the end of the slide 17 at the bottom in FIG. 8. The energy chain 27 runs, as is seen particularly from FIGS. 5-8, underneath the extension 16 and the slide 17 from the mounting element 15 to the front end of the slide 17. In the present embodiment, the energy chain 27 is divided into two parts and runs underneath the extension 16 and the slide 17. At the rear end of the slide 17, a bracket 28 is provided for the part 27a of the energy chain 27 originating from the front end of the slide 17, and for the part 27b of the energy chain 27 coming from the mounting element 15.

A cable drag of the type shown in WO 2010/054852 A2 is therefore not necessary, which is advantageous because this avoids the danger of tearing off the hanging cable that exists with the cable drag.

The operation of the extension motor 18 for the horizontal delivery unit 14 can preferably be regulated so that the startup takes place slowly, further travel is fast, and there is a deceleration before the end of the delivery movement. Thereby the current collector trolley 10 can be moved gently against the stop plate. In another advantageous embodiment, the extension motor 18 can also be furnished with a position sensor so that the precise position of the current collector trolley 10 relative to the crane base 1 can be determined.

In contrast to the telescoping delivery device shown in WO 2010/054852 A2, the horizontal delivery unit 14 according to the invention has less wear due to the elastic and/or flexible belt 22, so that the movement times into a new busbar arrangement 4 are reduced. The horizontal delivery unit 14 also has a smaller overall size because, differently than in a telescoping device, it is no longer necessary for several rectangular profiles to be run one inside the other.

The current collector trolley 10 is delivered in the horizontal delivery direction V via a vertical delivery unit 29 shown in FIGS. 4-14.

The vertical delivery unit 29 is permanently fixed to the slide 17 of the horizontal delivery unit 14 at the front end, on the right in FIGS. 4, 6, 7 and 9-12. At the upper and lower ends of the vertical delivery unit 29 in FIGS. 13 and 14, idle rollers implemented as toothed belt rollers 30, 31 are seated rotatably about an axis perpendicular to the vertical delivery direction V and perpendicular to the horizontal delivery direction H. The upper toothed belt roller 30 in FIGS. 13 and 14 is connected via a bevel gear 32 to a lifting motor 33 implemented as an electric motor. A belt 34, implemented as a toothed belt, single-ended in the present exemplary embodiment, the ends which are held together by means of a clamping device 35, runs over the toothed belt rollers 30, 31. The side of the toothed belt 34 to which the current collector trolley 10 is fixed constitutes a pulling strand 34a of the toothed belt. A mounting plate 36 to which the current collector trolley 10 is fixed is situated on the left outer side of the clamping device 35 in FIG. 14. The toothed belt 34 and thus the current electric trolley 10 are consequently motorically driven in the vertical delivery direction V between the toothed belt rollers 30, 31. An endlessly circulating toothed belt can be used in place of the single-ended toothed belt 34 held together by means of the clamping device 35. Other suitable belt drives can also be used, for example a V-belt drive with appropriately adapted rollers.

The electrical supply lines for the lifting motor 33, as well as the electrical supply lines for the crane 2 are run in a conventional energy chain 37, one end of which is fixed to the front end of the slide 17 or a frame part of the vertical delivery unit 29, and the other end of which is fixed to the current collector trolley 10 or the mounting plate 36. The lines are fed from the crane 2 to the vertical delivery unit 29 via a horizontal energy chain 27, wherein the front end of the part 27a of the energy chain 27 that runs on the slide 17 can also be fixed to a frame part of the vertical delivery unit 29 instead of to the slide 17.

In a preferred embodiment, the lifting motor 33 can be switched to no-load operation after the entry of the current collector trolley 10 into the support rail 8 and the electrical contacting between the current collector contacts 11 and the busbar 7. Thereby the toothed belt 34, inhibited by the initial tension of the toothed belt 34 and possibly the inertia of the rotor of the bevel gear 32 and the rotor of the lifting motor 33, can revolve around the toothed belt rollers 30, 31. The initial tension of the toothed belt 34 is preferably adjusted in such a manner, for example by the clamping device 33 or an advantageous tension roller, not shown, that the current collector trolley 10 can be held in its vertical position in normal operation without external interfering forces. If external interfering forces occur during movement of the crane 2, due to unevenness of the ground for example and thus changes of the height of the busbar system 9 relative to the busbar arrangement 4 occur, these changes are compensated by a movement of the toothed belt 34 in the vertical delivery direction V and the current collector 10 does not exert any additional forces onto the busbar arrangement 4.

Alternatively or additionally, the lifting motor 33 can also be driven in such a manner that it exerts a predetermined holding force on the toothed belt 34, so that the toothed belt 34 can be moved only if the predetermined forces are exceeded.

Another advantage of the mounting of the current collector trolley 10 via the elastic toothed belt 34 is that the toothed belt 34 itself can twist and rotate to a certain extent, so that the current collector trolley 10 can be decoupled from movements of the crane 2. For example, if the ground on which the crane 2 is driving has a slight tilt or inclination relative to the busbar 7, the rotation of the current collector trolley 10 about a horizontal, vertical axis can be compensated by the toothed belt 34. Certain changes of the distance between the crane 2 and the busbar arrangement in the horizontal delivery direction H can also be compensated by pressing or pulling the toothed belt 34 somewhat in the respective direction. Manufacturing imprecisions of the busbar arrangement 4, for example if the busbar does not run exactly straight or has certain height fluctuations over its length, can likewise be compensated to a certain extent. Climatically induced changes, due to temperature-induced expansion of materials for example, can thus be compensated without detriment to the operation of the crane.

Due to the elasticity of the toothed belt 34, different movements in a variety of spatial directions can in principle be compensated to an extent sufficient for the normal operation of the current collector system 9. Thus slight slants or lateral tilting of the crane 2 relative to the busbar arrangement can be compensated. Elaborate active tracking of the current collector trolley 10 is thus not necessary, nor is a completely free suspension, which entails the risk of poorer handling and controllability of the current collector trolley.

The clamping of the ends of the toothed belt 34 exerted by the clamping device 35 can advantageously be designed in such a manner that at least one end is detached from the clamping device when a predetermined force is exceeded. This is an additional protection against destruction or damage to the current collector system 9 or the crane system in a fault that exceeds the normal operational deviations. For example, if the crane 2 drives too far away from the busbar arrangement 4 due to an operating error, the clamping device 35 provides a designed breaking point from which the current collector trolley 10 can detach itself. Damage such as bending of the busbar 7 or the support rail 8 is thus avoided.

The operation of the lifting motor 33 for the horizontal vertical delivery unit 29 can preferably be regulated so that the startup takes place slowly, further travel is fast, and there is a deceleration before the end of the delivery movement. In this way the current collector trolley 10 can be gently driven up to the entry assistance means 6 and then introduced into the support rail 8. In another advantageous embodiment, the lifting motor 33 can also be furnished with a position sensor so that the precise position of the current collector trolley 10 in the vertical delivery direction V can be determined.

In one embodiment of the invention, not shown, no lifting motor 33 is provided, so that the current collector trolley 10 must be introduced vertically into the busbar arrangement 4 via conventionally known introduction devices. Despite that, the advantages described for the vertical delivery unit 29 according to the invention in compensating position deviations of the current collector trolley 10 are achieved.

The invention was described above with reference to a crane system in which the crane 2 travels back and forth between different busbar arrangements and must repeatedly move its current collector trolley 10 into a busbar 7. However, the invention can equally well be used for other movable consumers of electrical energy that must move by means of a current collector trolley 10 into a busbar or contact conductor arrangement.

The invention claimed is:

1. A current collector system for a vehicle movable along a busbar arrangement, the system comprising:
    a current collector trolley with current collector contacts arranged thereon connectable to a busbar of the busbar arrangement; and
    a vertical delivery unit for moving the current collector trolley in a vertical delivery direction,
    wherein the current collector trolley is movable in the vertical delivery direction by a belt drive having a belt made of a material that is at least one of an elastic material and a flexible material.

2. The current collector system according to claim 1, wherein the belt drive comprises two idle rollers arranged at opposite ends, in the vertical delivery direction, of the vertical delivery unit, about which rollers the belt circulates, wherein the current collector trolley is fixed to a pulling strand of the belt.

3. The current collector system according to claim 1, wherein the belt is a toothed belt or a V-belt.

4. The current collector system according to claim 1, further comprising a tensioning device for adjusting the initial tension of the belt.

5. The current collector system according to claim 1, wherein the vertical delivery unit includes an energy chain to guide supply lines from the vehicle to at least one of the current collector trolley and the vertical delivery unit, the energy chain having a first end fastened to the current collector trolley or a mounting plate for the current collector trolley and a second end fastened to a frame part of the vertical delivery unit.

6. The current collector system according to claim 1, further comprising a lifting motor for driving the belt.

7. The current collector system according to claim 6, wherein the lifting motor provides a holding force that holds the current collector trolley in a desired vertical position.

8. The current collector system according to claim 6, wherein the lift motor includes a position sensor for determining the position of the current collector trolley in the vertical delivery direction.

9. The current collector system according to claim 1, wherein the belt is an open-ended belt whose ends are held together by a clamping device.

10. The current collector system according to claim 9, wherein the clamping device clamps the ends of the belt together in such a manner that at least one end of the belt is detached from the clamping device if a predetermined force is exceeded.

11. The current collector system according to claim 9, wherein the current collector trolley is fixed via the clamping device to the belt.

12. A current collector system for a vehicle movable along a busbar arrangement, the system comprising:
    a current collector trolley with current collector contacts arranged thereon connectable to a busbar of the busbar arrangement, and
    a horizontal delivery unit with a delivery element movable in a horizontal delivery direction for moving the current collector trolley in the horizontal delivery direction,
    wherein the delivery element can be moved in the horizontal delivery direction by a belt drive having a belt made of a material that is at least one of an elastic material and a flexible material.

13. The current collector system according to claim 12, wherein the delivery element in the horizontal delivery direction is movably supported in an extension that is supported movably in the horizontal delivery direction in a mounting frame.

14. The current collector system according to claim 13, wherein the delivery element can be completely retracted into the extension.

15. The current collector system according to claim 13, wherein an extension motor for moving the extension in the horizontal delivery direction is arranged on the mounting frame.

16. The current collector system according to claim 15, wherein a drive pinion of the extension motor meshes with a rack fixed to the extension and running in the horizontal direction.

17. The current collector system according to claim 15, wherein the extension motor includes a position sensor for determining the position of the current collector trolley in the horizontal delivery direction.

18. The current collector system according to claim 14, wherein the belt drive comprises two idle rollers arranged at opposite ends, in the horizontal delivery direction, of the horizontal extension, about which rollers the belt runs, wherein a fastening strand of the circulating belt is fixed to the mounting frame and a pulling strand is fixed to the delivery element.

19. The current collector system according to claim 12, wherein the horizontal delivery unit includes an energy chain to guide feed lines from the vehicle to the current collector trolley, the energy chain having a first end fixed to the mounting frame and a second end fixed to the delivery element.

20. The current collector system according to claim 12, wherein the belt is a toothed belt or a V-belt.

21. The current collector system according to claim 12, further comprising a tensioning device for adjusting the initial tension of the belt.

22. The current collector system according to claim 12, wherein the system comprises a vertical delivery unit for moving the current collector trolley in a vertical delivery direction, wherein the current collector trolley can be moved in the vertical delivery direction by a vertical belt drive having a belt made of a material that is at least one of an elastic material and a flexible material.

23. The current collector system according to claim 22, wherein the vertical delivery unit is arranged on a front end of the delivery unit.

24. The current collector system according to claim 22, wherein the vertical delivery unit includes an energy chain to guide supply lines from the vehicle to at least one of the current collector trolley and the vertical delivery unit, the energy chain having a first end fastened to the current collector trolley or a mounting plate for the current collector trolley and a second end fastened to the front end of the delivery unit.

25. A system, comprising:
a crane, movable along a busbar arrangement, and
the current collector system of claim 1.

* * * * *